(12) United States Patent
Roy et al.

(10) Patent No.: US 11,954,692 B2
(45) Date of Patent: Apr. 9, 2024

(54) MITIGATING USER DISSATISFACTION RELATED TO A PRODUCT

(71) Applicant: International Business Machines Corporation, Armonk, NY (US)

(72) Inventors: Sujoy Roy, Kolkata (IN); Radha Mohan De, Howrah (IN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/782,420

(22) Filed: Feb. 5, 2020

(65) Prior Publication Data
US 2021/0241289 A1    Aug. 5, 2021

(51) Int. Cl.
| | |
|---|---|
| *G06Q 10/00* | (2023.01) |
| *G06N 20/00* | (2019.01) |
| *G06Q 30/016* | (2023.01) |
| *G06Q 30/0282* | (2023.01) |
| *G06Q 50/00* | (2012.01) |
| *H04L 67/12* | (2022.01) |
| *H04L 67/306* | (2022.01) |

(Continued)

(52) U.S. Cl.
CPC .......... *G06Q 30/016* (2013.01); *G06N 20/00* (2019.01); *G06Q 30/0282* (2013.01); *G06Q 50/01* (2013.01); *H04L 67/12* (2013.01); *H04L 67/306* (2013.01); *H04L 67/535* (2022.05); *G16Y 10/75* (2020.01)

(58) Field of Classification Search
CPC .. G06Q 30/016; G06Q 30/0282; G06Q 50/01; H04L 67/306; H04L 67/535
See application file for complete search history.

(56) References Cited

U.S. PATENT DOCUMENTS

| | | |
|---|---|---|
| 8,630,892 B2 | 1/2014 | Bhalla et al. |
| 10,909,602 B1 * | 2/2021 | Gailloux ............ G06Q 30/0631 |
| 10,990,996 B1 * | 4/2021 | Podgorny ............ G06V 40/174 |

(Continued)

OTHER PUBLICATIONS

Renjith, Shini. "An Integrated Framework to Recommend Personalized Retention Actions to Control B2C E-Commerce Customer Churn." International Journal of Engineering Trends and Technology (IJETT), vol. 27, No. 3, pp. 152-157 Sep. 2015. Seventh Sense Research Group, 2015 (Year: 2015).*

(Continued)

*Primary Examiner* — Gabrielle A McCormick
(74) *Attorney, Agent, or Firm* — Peter Suchecki

(57) ABSTRACT

Provided is a method, computer program product, and system for mitigating user dissatisfaction with a product. A processor may collect a first set of user interaction data and a first set of user sentiment data related to the product. The processor may generate a user profile for the user, including a satisfaction threshold for using the product based in part on the first set of user interaction data and the first set of user sentiment data. The processor may monitor a second set of user interaction data and a second set of user sentiment data. The processor may compare the second set of user interaction data and the second set of user sentiment data to the satisfaction threshold and determine that the user is experiencing dissatisfaction with the product when the satisfaction threshold has been exceeded. In response, the processor may output an action to reduce dissatisfaction of the user.

18 Claims, 6 Drawing Sheets

400

Analyze historical user interaction data and historical user sentiment data in response to historical actions outputted to a plurality of users
405

↓

Correlate historical success rates for a set of historical actions that have successfully reduced dissatisfaction with the product for the plurality of users
410

↓

Implement one of the set of historical actions when outputting the action to reduce dissatisfaction of the user
415

(51) Int. Cl.
  *H04L 67/50* (2022.01)
  *G16Y 10/75* (2020.01)

(56) References Cited

U.S. PATENT DOCUMENTS

| | | | |
|---|---|---|---|
| 2012/0110463 A1* | 5/2012 | Brolley | G06Q 30/0282 |
| | | | 715/738 |
| 2012/0144242 A1* | 6/2012 | Vichare | G06F 11/0751 |
| | | | 714/39 |
| 2016/0253688 A1 | 9/2016 | Nielsen et al. | |
| 2016/0261465 A1* | 9/2016 | Gupta | H04L 43/04 |
| 2017/0108995 A1* | 4/2017 | Ali | G06F 3/0481 |
| 2017/0186018 A1 | 6/2017 | Nandi et al. | |
| 2017/0193527 A1* | 7/2017 | Backer | G06F 8/71 |
| 2017/0270419 A1* | 9/2017 | Sanchez | G06Q 30/016 |
| 2018/0101579 A1* | 4/2018 | Jaiswal | G06F 9/451 |
| 2018/0276689 A1* | 9/2018 | Zhang | G06Q 30/0631 |
| 2019/0102820 A1* | 4/2019 | Gupta | G06Q 30/0251 |
| 2019/0268214 A1 | 8/2019 | Maes et al. | |
| 2020/0065835 A1* | 2/2020 | Manikandan | G06F 16/2228 |
| 2021/0081759 A1* | 3/2021 | Zhao | G06N 3/049 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

MITIGATING USER DISSATISFACTION RELATED TO A PRODUCT

BACKGROUND

The present disclosure relates generally to the field of artificial intelligence, and more specifically to mitigating user dissatisfaction toward a product using predicative analytics.

Customer services management is arguably the most critical part of businesses today. Making the customer happy is essential to running a successful enterprise. Insufficient or improper customer support and/or responses to dissatisfied customers may lead to the loss of customers to other competitors. Further, inadequate customer support may result in strained customer relationships which may lead to negative publicity on various social media platforms.

SUMMARY

Embodiments of the present disclosure include a method, computer program product, and system for mitigating user dissatisfaction related to a product. A processor may collect a first set of user interaction data related to the product from a device on a network and a first set of user sentiment data related to the product from a communication channel. The user interaction data and the user sentiment data are specific to a user. The processor may generate a user profile for the user, the user profile including a satisfaction threshold for using the product based in part on the first set of user interaction data and the first set of sentiment data. The processor may monitor a second set of user interaction data related to the product from the device on the network and a second set of user sentiment data related to the product from the communication channel. The processor may compare the second set of user interaction data and the second set of user sentiment data to the satisfaction threshold. The processor may determine that the user is experiencing dissatisfaction with the product when the satisfaction threshold has been exceeded. In response to the satisfaction threshold being exceeded, the processor may output an action to reduce dissatisfaction of the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
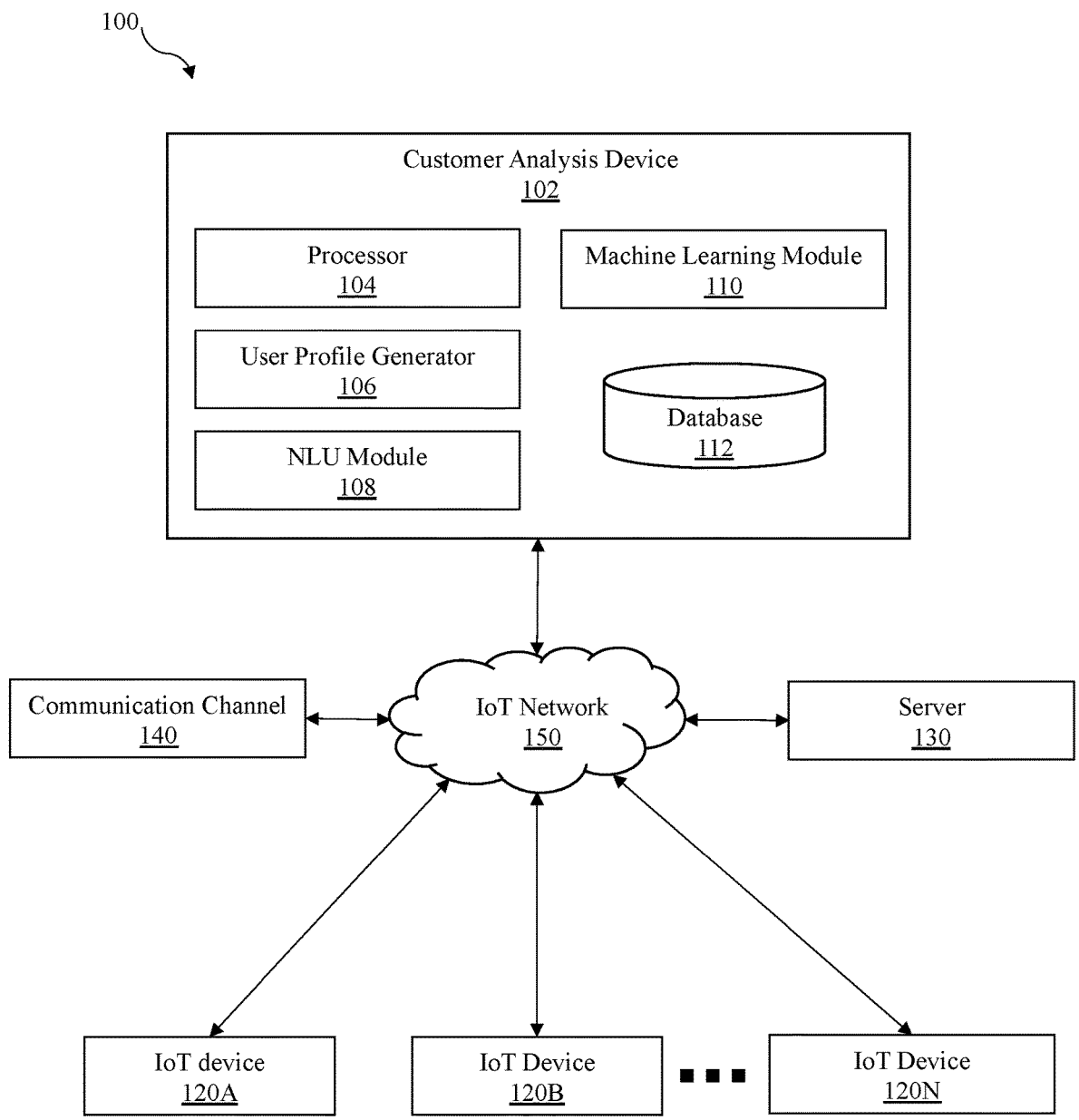
FIG. 1 illustrates a block diagram of a customer analysis system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of artificial intelligence, and more particularly to mitigating user dissatisfaction toward a product using predicative analytics. While the present disclosure is not necessarily limited to such applications, various aspects of the disclosure may be appreciated through a discussion of various examples using this context.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In many instances, customer support responses to dissatisfied customers are reactive in nature. Specifically, the remediation process used to resolve customer dissatisfaction with a product typically occurs after the customer has filed or voiced a complaint with the company that sold the product. In many cases, the dissatisfied customer will retain ill will toward the company even after an attempt at remediation of the customer's dissatisfaction has ensued. For example, to increase the satisfaction of the customer, a company may engage in repetitive attempts to provide various solutions for a defective product, such as attempting to fix issues with the product, offering a refund, and/or replacing of the product. However, the customer may move on to a competitor because of dissatisfaction with both the timeliness of the company's remediation attempts and the defective product. As a result, the company may suffer financially due to inadequate customer support responses and/or remediation techniques.

Embodiments of the present disclosure relate to a system for determining if a user (e.g., customer) is satisfied with a product and, if not, mitigating the reason(s) for dissatisfaction with the product before the customer relationship with the product's maker and/or service provider is strained. The product may be any type of product that can be tracked via a network (e.g., Internet of things (IoT) network). The product may be an IoT device (e.g., smart phone, smart dishwasher, smart speaker, etc.) that can track how a user interacts with the product and/or various functions of the product. For example, the product may be a smart phone that tracks how the user interacts with the features of the phone (e.g., the touchscreen, various apps, voice activation software, media, etc.).

In another example, the product may be accessible through the IoT device itself. For example, the product may be a streaming music service on the smart phone, where the smart phone can track how the user interacts with the music service (e.g., length of listening times, how often music is downloaded, genre of music, etc.). Additionally, user interaction data related to the product can be collected from other associated IoT devices throughout the IoT network. In embodiments, the IoT network may be a social IoT network where each IoT device on the network may share and/or exchange its data feed to be analyzed in order to determine how the user interacts with the product. Returning to the previous example, user interaction data regarding the streaming music service (e.g., the product) on a smart phone may further be tracked by a smart speaker where the streaming music service may also be accessed. The user interaction data from the smart phone, streaming music service application itself, and the smart speaker data feeds may be shared to accurately determine the usage pattern of the user with respect to the streaming music service.

In embodiments, the system utilizes analysis of user interaction data by the user with various IoT devices through the IoT network to reveal insights about the user's behavior toward the product (e.g., the IoT device itself, an application on the IoT device, a brand related to one or more IoT devices, etc.). The system uses various machine learning and/or artificial intelligence techniques to analyze the user interaction data to generate an initial usage pattern for the respective user with the given product.

In embodiments, the system further analyzes available communication channels (e.g., social media websites, product and/or service provider websites, customer support lines, etc.) utilized by the user to augment the user's usage pattern with initial feelings about the respective product. The system gathers user sentiment data (e.g., unstructured data, user posts, messaging, spoken content, etc.) regarding the product collected from the communication channels and analyzes the data using natural language understanding (NLU) to determine how the user feels about the product. For example, the system may collect user sentiment data from a social media website indicating that the customer is happy with their new smart speaker they recently purchased (e.g., a social media comment by the user stating, "I love my new smart speaker!").

In embodiments, the system uses both the initial user interaction data collected from the IoT network and the initial user sentiment data collected from the communication channel to generate a user profile specific to the user that is associated with the respective product. The user profile includes a satisfaction threshold that is based, in part, on the initial user interaction data regarding the user's usage pattern and the user sentiment data regarding feelings the user has toward the product. The satisfaction threshold may be generated using a scoring matrix or scoring model by analyzing the initial user interaction data and user sentiment data. For example, an active usage pattern with the product and positive sentiment data about the product will result with high scoring values thus generating a high satisfaction threshold.

In embodiments, once the satisfaction threshold is established and encoded in the user profile, the system will continually monitor the user's interaction data with the product via the IoT network, while concurrently monitoring the feelings and/or sentiment the user has expressed regarding the product through the communication channel. The monitored user interaction data and user sentiment data can be continuously compared to the satisfaction threshold, and if the threshold is exceeded, the system will determine the user is dissatisfied with the product.

For example, user interaction data received from the IoT network may indicate the user is not using the product as often (e.g., not using a smart speaker because of a volume button issue) and/or the user is unhappy with the product (e.g., image recognition of an unhappy user through an IoT camera, voice recognition of a frustrated user through an IoT speaker when using the product, etc.). Further, the system may collect various user sentiment data that indicates there may be an issue with product. For example, the system may collect data that indicates the product is not working correctly from various social media posts regarding the product associated with the user (e.g., "Does anyone else have an issue with their smart speaker's volume button?"). The system analyzes changes in the user interaction data (e.g., drop in usage with the respective product) from the IoT network and the user sentiment data (e.g., negative sentiment indicating an issues with the smart speaker's volume button) from the communication channel and compares the data to the satisfaction threshold to determine if the user is experiencing dissatisfaction. If the data exceeds the satisfaction threshold, the system will determine the user is dissatisfied with the product.

Once the system determines the user is dissatisfied with the product, the system will automatically perform an action to pacify the customer in an attempt to reduce dissatisfaction with the product and prevent straining the customer relationship with the product's maker or provider. For example, the system may output various automated actions such as arranging immediate customer service appointments when the first sign of dissatisfaction with the product is identified. Returning to the example above, the system may immediately schedule a maintenance appointment to fix the smart speaker's volume button. In another example, the system may automatically send complimentary offers to a user that has become dissatisfied with a product or service (e.g., discounts for music for a user that has decreased downloading music on his streaming device over time). In this way, the system may make immediate attempts to mitigate any user dissatisfaction with a product before the user files a complaint, voices a bad review of the product on various social networking sites, and/or chooses an alternative product from another competitor.

In embodiments, the output of various actions may be determined by using past incident history, customer buying patterns, and/or company policy for mitigating risks that have worked in previous attempts to reduce dissatisfaction. For example, the system may use supervised learning to categorize behavioral types for user profiles and identify the user's preference for mitigating past dissatisfaction accordingly. In this way, the correlation between pacification strategy and users based on the user profiles may determine the best action for each customer, resulting in an improved customer relationship between the user and the product's maker, service provider, and/or brand.

In some embodiments, the user(s) must opt into the system in order for the system to collect their information, and the user may determine which other users (e.g., product makers, service, providers, brands, etc.) can be output actions to the user based on the collected data. For example, during an initialization process, the system may inform the user of the types of data that it will collect (e.g., user interaction data from various IoT devices, user sentiment data from social media sites, etc.) and the reasons why the data is being collected. In these embodiments, the system will only start collecting the user information upon the user explicitly permitting the collection. Furthermore, the system may only collect the data that is necessary to provide actions for reducing dissatisfaction of the user with the respective product, the data may be anonymized and/or encrypted while in use, and the data may only be maintained as needed for providing necessary actions. If the user chooses to opt out of the system, any user information previously collected may be permanently deleted.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of customer analysis system 100, in accordance with embodiments of the present disclosure. In the illustrated embodiment, customer analysis system 100 includes customer analysis device 102 that is communicatively coupled to IoT device 120A, IoT device 120B, IoT device 120N (collectively referred to as IoT device(s) 120), server 130, and communication channel 140 via IoT network 150. Customer analysis device 102, IoT devices 120, and server 130 may be any type of computer system and may be substantially similar to computer system 1101 of FIG. 5. In embodiments, customer analysis device 102 may a stand-alone device or located on cloud technology. For example, customer analysis device 102 may be a virtual application accessed through a cloud computing network, such as cloud computing environment 50 described in FIG. 6.

IoT devices 120 may be any type of device (e.g., smart phone, smart speaker, smart dishwasher, smart car, etc.) configured to generate user interaction data related to a product. The product may be one of the IoT devices 120 or the product may be accessible through the IoT devices 120. For example, IoT device 120A may be a smart phone that generates user interaction data for a video streaming service application (e.g., the product) located on the IoT device 120A itself. The user interaction data collected from the smart phone may be used to determine how often a user interacts with the video streaming service application (e.g., frequency of movie and/or tv show downloads, how often user watches movies/tv shows, genres, etc.). While IoT device 120B may be a smart tv that collects similar user interaction data regarding the video streaming service application, where the video streaming service application is accessible through the IoT device 120B itself. In embodiments, customer analysis device 102 can utilize both sets of user interaction data from the IoT devices 120A and 120B to determine usage patterns of the user with regard to the video streaming service application product.

Communication channel 140 may be any type of channel where a user may voice their opinion on a product (e.g., social media channel, telecommunications channel, customer service line, messaging channel, etc.). For example, the communication channel 140 may be a social networking website where a user may post messages regarding the performance of the product. In another example, the communication channel 140 may be a digital telephone service where the user may discuss the product (e.g., customer service line). In embodiments, the customer analysis device 102 may collect user sentiment data (e.g., posted messages on social media, spoken content from the digital telephone service, unstructured data, etc.) from communication channel 140 in order to determine user satisfaction with the product. The user sentiment data may be analyzed by natural language understanding (NLU) module 108 to determine user sentiment toward the product.

IoT network 150 may be any type of communication network, such as a wireless network or a cloud computing network. IoT network 150 may be substantially similar to, or the same as, cloud computing environment 50 described in FIG. 6. In embodiments, IoT network 150 may be a social IoT network where IoT devices 120 may share and/or exchange user interaction data feeds to determine usage patterns of the user with respect to the product. In some embodiments, IoT network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium.

For example, customer analysis device 102 may communicate with IoT devices 120 server 130, and communication channel 140 using a WAN, one or more hardwire connections (e.g., an Ethernet cable) and/or wireless communication networks. In some embodiments, the various systems may be communicatively coupled using a combination of one or more networks and/or one or more local connections. For example, customer analysis device 102 may communicate with server 130 using a hardwired connection, while communication between IoT devices 120, communication channel 140, and customer analysis device 102 may be through a wireless communication network.

In the illustrated embodiment, customer analysis device 102 includes processor 104, user profile generator 106, NLU module 108, machine learning module 110, and database 112.

In embodiments, user profile generator 106 is configured to generate a user profile associated with the user. User profiles may be stored on database 112 of customer analysis device 102 or server 130. The user profile may utilize a central registration identifier to manage all IoT devices 120 owned by the user within IoT network 150. The user profile may include various social identifiers (e.g., email, social media account names, contact information) that allow customer analysis device 102 to track user sentiment data collected from communication channel 140. Further, the social identifiers included in the user profile allow customer analysis device 102 to automatically output various actions (e.g., set up maintenance service for the product, sending discount coupons, offering guidance on how to user product, etc.) to the user when attempting to mitigate dissatisfaction with the given product. For example, customer analysis device 102 may send various actions directly to the user's smart phone, email, or user interface of an IoT device 120.

In embodiments, the central registration identifier and social identifiers may be manually inputted by the user when activating one or more of the IoT devices 120 (e.g., product registration, when adding the respective IoT device to the IoT network, etc.) or when purchasing a product tracked through IoT network 150 (e.g., signing up for video or music service). In some embodiments, the registration identifier and social identifiers may be automatically shared through the IoT network 150 to various trusted IoT devices (e.g., IoT devices made by the same manufacturer, IoT devices in the same household, etc.).

In embodiments, customer analysis device 102 may automatically identify the user by recognizing certain IoT devices 120 (e.g., user wearables and/or smart phone communicatively coupling to the customer analysis device 102 via IoT network 150) associated with the user. In this way, using the user profile allows the system to identify which user is interacting with which IoT device 120 and/or product. Once users are identified by customer analysis device 102, user interaction data related to various products may be collected from the IoT devices 120 through IoT network 150. Further, user profiles may be associated with various user accounts on communication channel 140 allowing the customer analysis device 102 to collect user sentiment data.

In embodiments, NLU module 108 may collect, monitor, and/or analyze user sentiment data (e.g., social media posts, comments, spoken content, customer service logs, unstructured data, etc.) from communication channel 140 to determine how the user is feeling about the given product. For example, NLU module 108 may collect user sentiment data from a social media comment related to the product expressing that the given product is difficult to use. In another example, the NLU module may collect user sentiment data from a comment posted by the user on a service provider web site indicating the user is unhappy with the brand/manufacturer of the product because they have failed to return their call. NLU module 108 may analyze the user sentiment data and determine the user is unhappy with the product and/or brand. NLU module 108 may utilize a scoring model for assessing the user sentiment data (e.g., a range from 1-10, +1 for positive sentiment and −1 negative sentiment, a percentage, etc.).

In embodiments, machine learning module 110 may collect, monitor, and/or analyze user interaction data received from IoT devices 120 and/or IoT network 150 to determine usage patterns of the user with respect to the given product. Machine learning module 110 may score the user interaction data (e.g. range 1-100, percentage, etc.) similarly to the user sentiment data in order to assess the user's initial usage pattern with the product. Machine learning module 110 may utilize the collected user interaction data score in combination with user sentiment data score to generate a satisfaction threshold specific to a user and the product.

In embodiments, machine learning module 110 may continuously monitor user interaction data and user sentiment data related to the given product to be measured against the satisfaction threshold. If the satisfaction threshold has been exceeded, the system will determine the user is dissatisfied with the product. In response, customer analysis device 102 may output one or more actions to mitigate dissatisfaction of the user toward the given product. For example, customer analysis device 102 may automatically send a discount coupon for a buy one get one free movie download to a user that is dissatisfied with their movie streaming service (e.g., user interaction data indicating a drop in usage with the movie streaming service and user sentiment data from a social media site where the user has complained movie download prices are too expensive). In embodiments, the actions may be retrieved from a corpus of various actions and/or mitigation techniques for reducing dissatisfaction stored on database 112.

In embodiments, machine learning module 110 can utilize machine learning and/or deep learning, where algorithms or models can be generated by performing supervised, unsupervised, or semi-supervised training on historical user interaction data and/or user sentiment data and correlate historical success rates when outputting various actions in order to mitigate dissatisfaction of the user with the given product, product maker, and/or brand.

For example, machine learning module 110 may utilize logical regression, decision tree classification, or support vector machine-based classification to determine when/which actions are successful or unsuccessful (e.g., success/performance rate of the system) in reducing the dissatisfaction of the user. Over time, machine learning module 110 can analyze the results to accurately predict various types of actions that worked best for specific users based on their user profile information (e.g., usage pattern increases after the action was initiated, user sentiment improvement toward the product and/or brands in response to the action, etc.). In this way, customer analysis device 102 may help the product maker, service provider, and/or brand assess make predictions on which actions work best for mitigating dissatisfaction with certain products allowing them to maintain a strong customer relationship while preventing any customer loss when unforeseen issues arrive with their products.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of customer analysis system 100. In some embodiments, however, individual components may have greater or lesser complexity than as represented in FIG. 1, components other than or in addition to those shown in FIG.

1 may be present, and the number, type, and configuration of such components may vary. Likewise, one or more components shown with customer analysis system 100 may not be present, and the arrangement of components may vary.

For example, while FIG. 1 illustrates an example customer analysis system 100 having a customer analysis device 102, three IoT devices 120, a single server 130, and a single communication channel 140, suitable network architectures for implementing embodiments of this disclosure may include any number of customer analysis devices, IoT devices, servers, and communication channels. The various models, modules, systems, and components illustrated in FIG. 1 may exist, if at all, across a plurality of customer analysis devices, IoT devices, servers, and communication channels.

Figure 2:
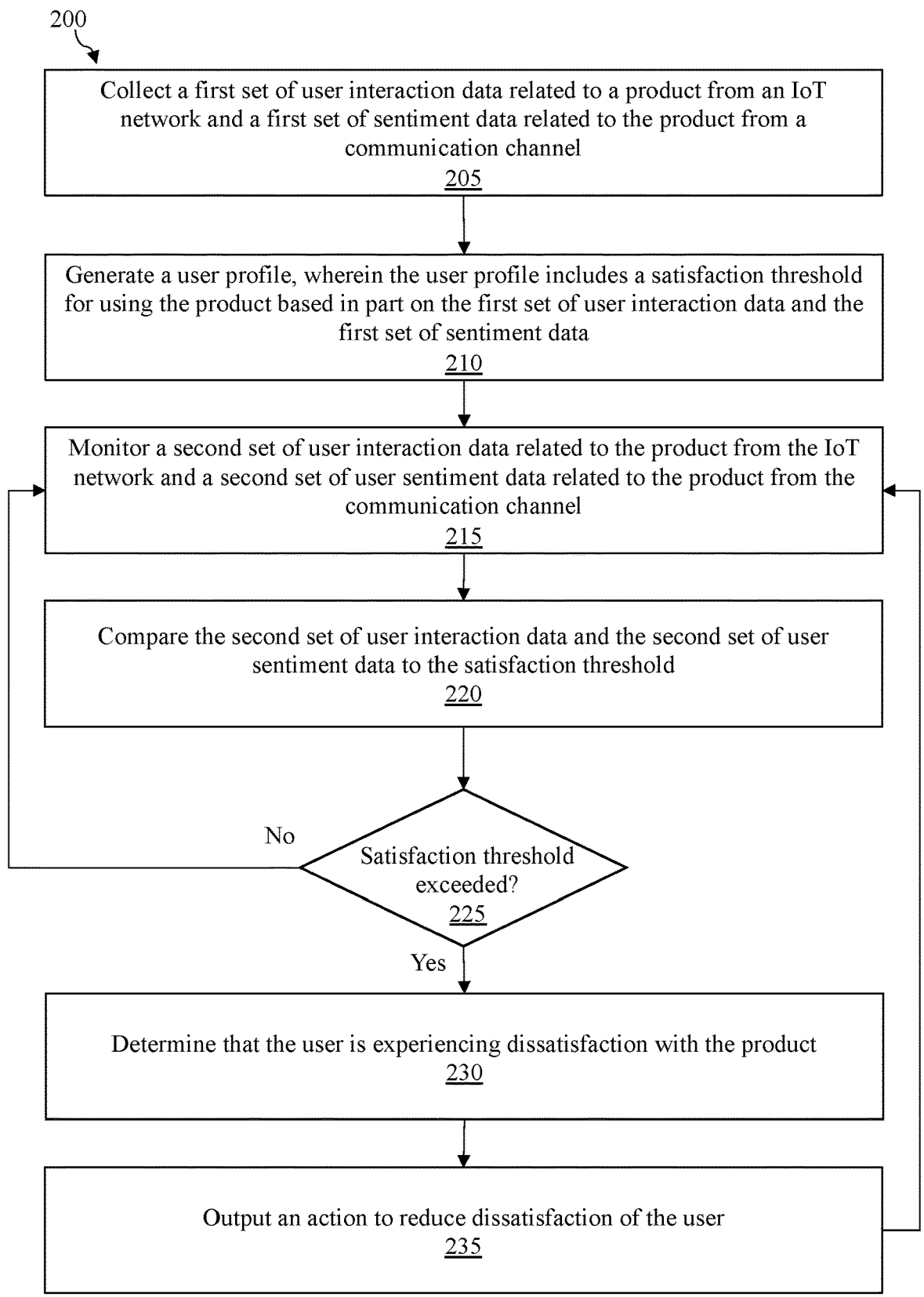
FIG. 2 illustrates a flow diagram of an example process for mitigating user dissatisfaction related to a product, in accordance with embodiments of the present disclosure.

Referring now to FIG. 2, shown is a flow diagram of an example process 200 for mitigating user dissatisfaction with a product, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by collecting a first set of user interaction data related to a product from an IoT network and a first set of user sentiment data related to the product from a communication channel. This is illustrated at step 205. The user interaction data and user sentiment data are specific to a user and the user's usage of the product.

For example, the user interaction data may be pattern or usage data collected from a smart dishwasher (e.g., the product) indicating how often the user utilizes the dishwasher and/or the various features of the dishwasher (e.g., types of rinse cycles, runtimes, runs/week, etc.). The user interaction data may also include usage data collected from other IoT devices that are connected through the IoT network to the smart dishwasher. For example, the system may gather user interaction data from both a smart phone and a voice recognition speaker that may be used to automatically activate and/or perform various operating functions related to the dishwasher. In this way, the system may gather all available user interaction data from the IoT network regarding the smart dishwasher.

The user sentiment data may be in the form of unstructured data collected from various communication channels (e.g., social media channels, product review websites, telecommunication lines, etc.) where the user mentions the product. Returning to the previous example, user sentiment data may be in the form of textual content written by the user on a product review website saying how much they like the smart features of their new smart dishwasher.

The process 200 continues by generating a user profile for the user. This is illustrated at step 210. In embodiments, the user profile includes a satisfaction threshold for using the product based in part on the first set of user interaction data and the first set of user sentiment data. The system may generate the satisfaction threshold based on the initial usage pattern of the user related to the product and the initial feelings the user has when first using the product. In embodiments, the system may utilize a scoring model to score both the user interaction data and the user sentiment data to generate the satisfaction threshold. For example, the user may initially use a new product at a high rate (e.g., resulting in a high score for user interaction data) and have positive feelings (e.g., resulting in a high sentiment score) toward the product after the initial purchase leading the system to generate a high satisfaction threshold.

Once the user profile has been generated, the process 200 continues by monitoring a second set of user interaction data related to the product from the IoT network and a second set of user sentiment data related to the product from the communication channel. This is illustrated at step 215. In some embodiments, the second set of user interaction data and the second set of user sentiment data are gathered subsequently to the first set of user interaction data and the first set of user sentiment data. Returning to the previous example, the system will continually monitor the usage pattern and sentiment of the user with regard to the smart dishwasher through the IoT network and the communication channel to determine if any changes have occurred.

The process 200 continues by comparing the second set of user interaction data and the second set of user sentiment data to the satisfaction threshold. This is illustrated at step 220. In embodiments, the system may use a scoring model when comparing the data. For example, the second set of user interaction data and the second set of user sentiment data may be provided a score and that score will be compared to the scores used to generate the satisfaction threshold (as described in FIG. 3). In some embodiments, the first set of user interaction data and the first set of user sentiment data may be compared directly to the second set of user interaction data and the second set of user sentiment data, respectively (e.g., without generating a score). The process 200 continues by determining if the satisfaction threshold has been exceeded. This is illustrated at step 225. If the satisfaction threshold has been exceeded ("yes" at step 225), then the system determines that the user is experiencing dissatisfaction with the product. This is illustrated at step 230. Returning to the previous example, the system may compare the user interaction data related to the smart dishwasher and determine that the user has not used the dishwasher in over a month. Or alternatively, user interaction data taken from the user's smart phone that is connected to the smart dishwasher may indicate the user has ceased using various features of the dishwasher accessible through the smartphone that were previously used on a regular basis (e.g., activating smart rinsing cycles and/or drying cycles, obtaining performance rates, etc.). Further, analysis of the communication channel may show user sentiment data indicating the user is now unhappy with the smart dishwasher (e.g., user stating on a messaging board, "My smart drying cycle doesn't seem to be drying my dishes anymore in my smart dishwasher."). The system will analyze this user interaction data/user sentiment data and likely determine there is an issue with the dishwasher if the data exceeds the satisfaction threshold.

If the satisfaction threshold has not been exceeded ("no" at step 225), the process 200 returns to step 215 to continue monitoring the user interaction data and the user sentiment data related to the product.

Once the system determines the user is experiencing dissatisfaction with the product at step 230, the process 200 continues by outputting an action to reduce dissatisfaction of the user. This is illustrated at step 235. In embodiments, the action may be any type of action configured to mitigate dissatisfaction of the user with the product, the product's maker, or brand. Returning to the previous example, the system may automatically send the user a customer service appointment to have a technician come out to look at the defective smart dishwasher. In this way, the system will attempt to fix the product prior to the user having to call customer service. Another example of an action may be to send a root cause analysis report related to the dissatisfaction experienced by the user with the product. This may reduce the user's dissatisfaction with the understanding that the product's maker or brand is working to address the problem immediately. In another example, the system may send a complimentary offer for one or more other discounted products to the user with an apology about the defective product. In another example, the action outputted by the system may be to offer guidance to a user that has been determined to be struggling with using the product (e.g., issues setting up the product, unable to use various features of the product, etc.). In yet another example, the system may transmit a firmware or software update to the product to fix/mitigate the problem.

In embodiments, once the action has been outputted by the system, the process 200 continues by returning to step 215 where the system continues to monitor the user interaction data and user sentiment data to determine if the user's dissatisfaction towards the product has reduced. If the dissatisfaction has not reduced, the system may attempt to output further actions in an attempt to reduce the dissatisfaction. If the dissatisfaction has reduced, the system may mark the action as a successful attempt to reduce dissatisfaction with the product and utilize this pacification strategy for other similarly situated users (e.g., based on similar user profile information, similar products, product affinity, usage patterns, user sentiment data, etc.).

Figure 3:
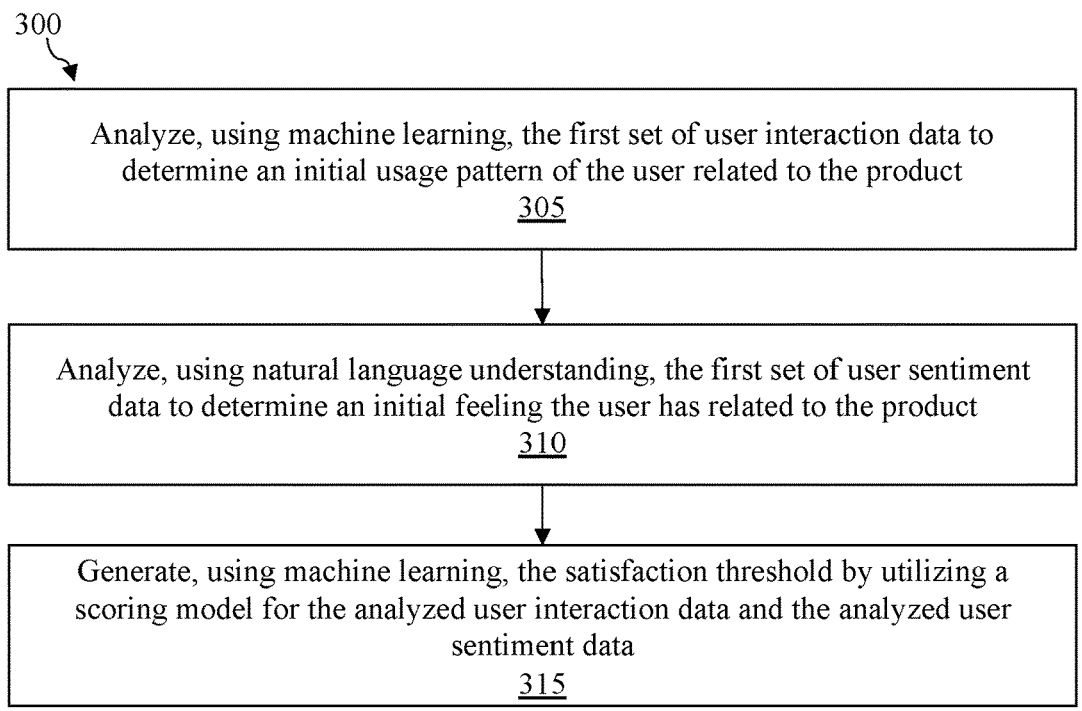
FIG. 3 illustrates a flow diagram of an example process for generating a satisfaction threshold, in accordance with embodiments of the present disclosure.

Referring now to FIG. 3, shown is a flow diagram of an example process 300 for generating a satisfaction threshold, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In embodiments, process 300 may be, in addition to, or a subset of process 200. In embodiments, the process 300 is a computer-implemented process. The process 300 may be performed by processor 104 exemplified in FIG. 1.

The process 300 begins by analyzing, using machine learning, the first set of user interaction data to determine an initial usage pattern of the user related to the product. This is illustrated at step 305. The user interaction data can be any data the identifies how the user interacts with a product. For example, the product may be a video game that is accessible on various IoT devices (e.g., smart phone, computer, smart television, gaming system, etc.) that can track usage patterns, such as how often the user plays the game, how the user interacts with ads placed within the game, how the user interacts with the IoT devices while playing, etc.

The process 300 continues by analyzing, using natural language understanding, the first set of user sentiment data to determine an initial feeling the user has related to the product. This is illustrated at step 310. The user sentiment data can be any type of unstructured data taken from a communication channel that expresses how the user feels about the product. For example, user sentiment data may be in the form of textual content related to the product taken from a game messaging board.

The process 300 continues by generating, using machine learning, the satisfaction threshold by utilizing a scoring model for the analyzed first set of user interaction data and the analyzed first set of user sentiment data. This is illustrated at step 315. In embodiments, the system may use any type of scoring model to score the analyzed data. For example, the system may score the user interaction data based on a percentage or range, while the user sentiment data may be given a positive (e.g. +1), negative (−1), or neutral (0) score for detected sentiment associated with each word voiced by the user in relation to the product in order to generate an overall score. The scoring of the data is used to generate the initial satisfaction threshold for the user based on how the user behaves and feels about the product during initial use. The initial satisfaction threshold may be based, in part, on any type of scoring model that utilizes both the user interaction data score and the user sentiment data score (e.g., scoring matrix). Returning to the previous example, based on the analyzed data, the system may generate a satisfaction threshold for a product relative to a user based on data that shows the user enjoys playing the video game often and continually writes positive comments regarding the product on the game message board. Once the satisfaction threshold is generated, the process 300 may return to step 215 of process 200.

In embodiments, the satisfaction threshold may be adjusted based on further analysis of historical user interaction data and historical user sentiment data in response to various actions. In this way, the sensitivity of the satisfaction threshold may be adjusted based on data indicating the user was not actually dissatisfied with the product (e.g., false reading in usage pattern such as when a user is on vacation and not using the IoT device/or product).

Figure 4:
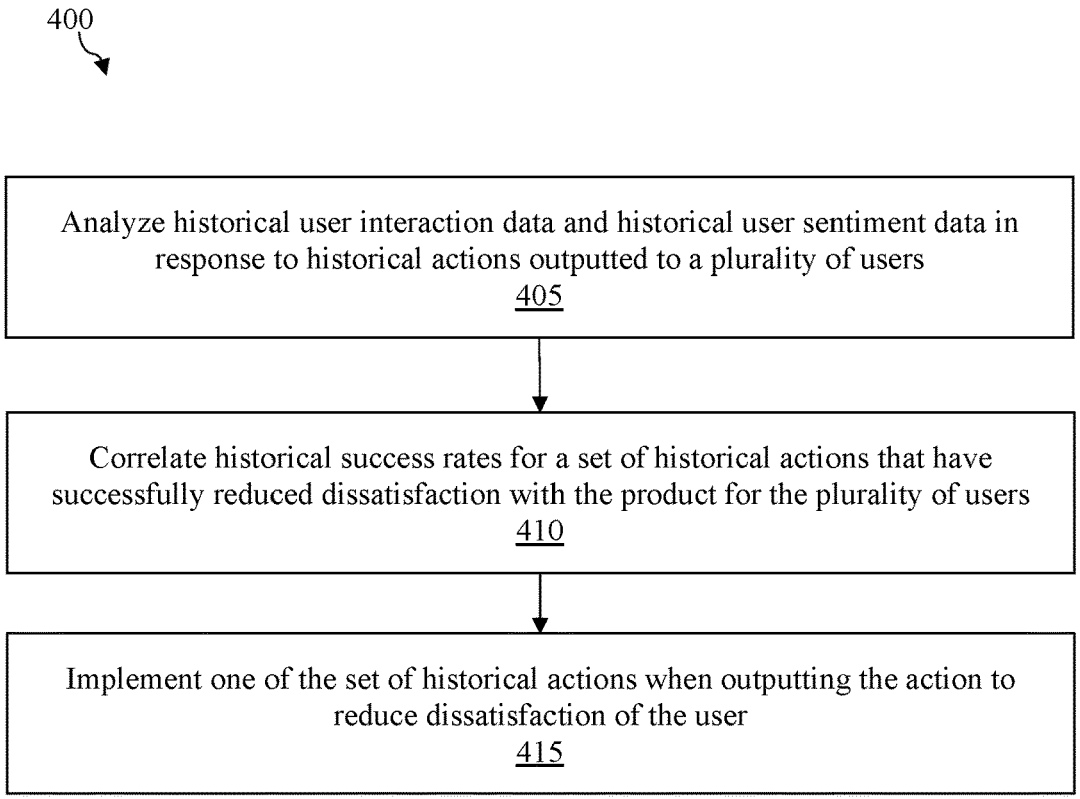
FIG. 4 illustrates a flow diagram of an example process for predicting successful actions for reducing dissatisfaction with a product, in accordance with embodiments of the present disclosure.

Referring now to FIG. 4, shown is a flow diagram of an example process 400 for predicting successful actions for reducing dissatisfaction with a product, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In embodiments, process 400 may be, in addition to, or a subset of process 200. In some embodiments, the process 400 is a computer-implemented process. The process 400 may be performed by processor 104 exemplified in FIG. 1.

The process 400 begins by analyzing, using machine learning, historical user interaction data and historical user sentiment data in response to historical actions outputted to reduce dissatisfaction with the product to a plurality of users. This is illustrated at step 405. In embodiments, the system can utilize machine learning and/or deep learning, where algorithms or models can be generated by performing supervised, unsupervised, or semi-supervised training on historical user interaction data/user sentiment data for a plurality of users.

The process 400 continues by correlating historical success rates for a set of historical actions that have successfully reduced dissatisfaction with the product for the plurality of users. This is illustrated at step 410. The system will determine which actions have had the most success when mitigating dissatisfaction of users with respective products. This will allow product makers/brands to make informed decisions on what are the best strategies for maintaining customer relationships that may have been strained by various issues with their products. In embodiments, the system may utilize the correlated historical success rates for actions that have successfully reduced dissatisfaction with the product and categorize that data by indicators of dissatisfaction and/or the specific issue that was causing dissatisfaction.

The process 400 continues by implementing one of the set of historical actions when outputting the action (at step 235 of process 200) to reduce dissatisfaction of the user. This is illustrated at step 415. In this way, the system may continually predict the best strategies for obtaining a positive outcome on future occasions when outputting actions for reducing user dissatisfaction with the product.

In some embodiments, the system may receive a set of default actions that are not based on historical actions for instances where the system does not have enough data to determine historical success rates of previously implemented actions. The set of default actions may be based on conventional wisdom (e.g., rule of thumb) for reducing dissatisfaction of the user related to a product. In some embodiments, the system may utilize additional data (e.g., cost of implementing actions vs. effect on dissatisfaction) to determine the most appropriate action to output to a user.

Figure 5:
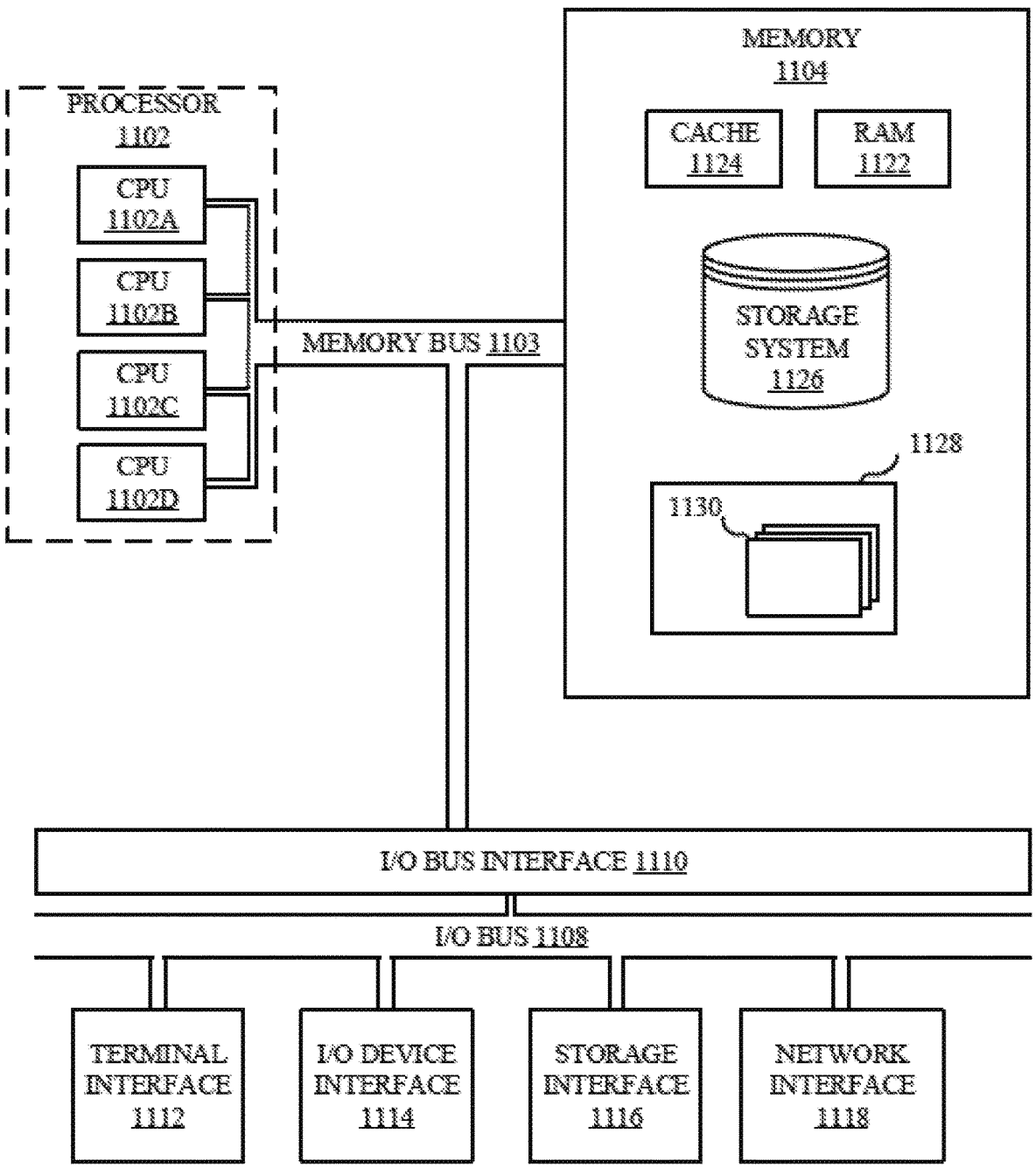
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 3 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment.

Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
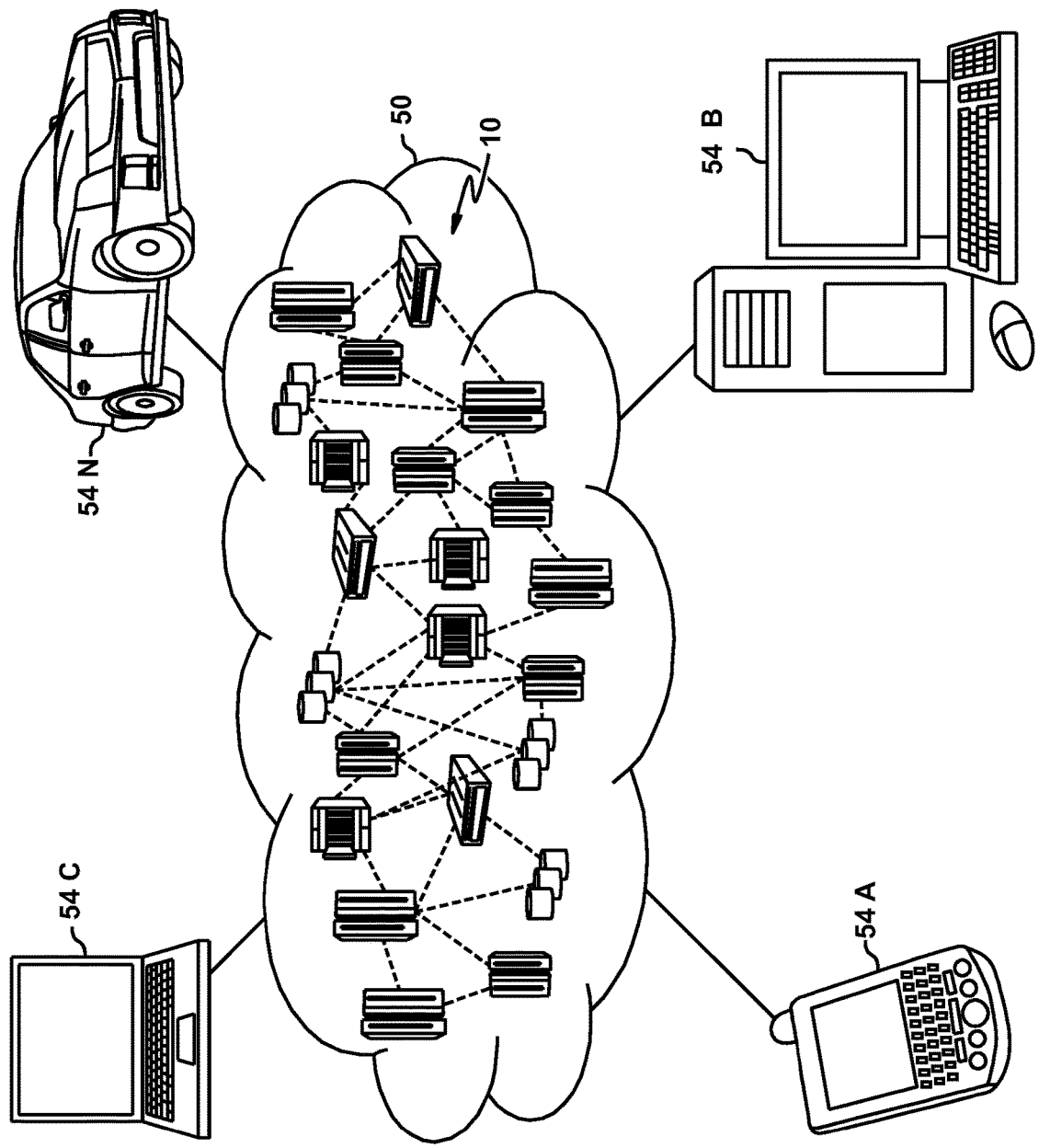
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
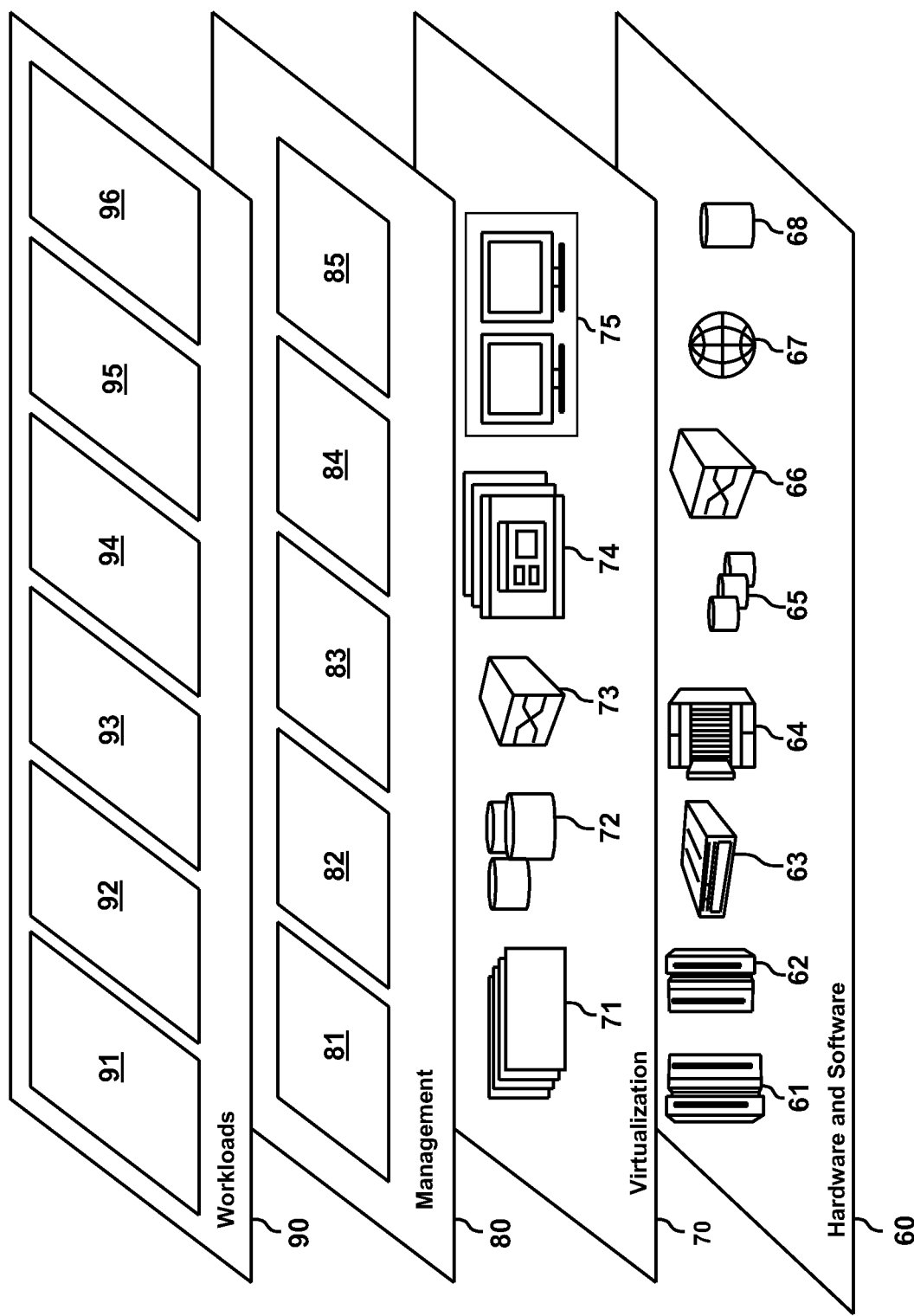
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and customer analysis software 68 in relation to the customer analysis device 102 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    collecting a first set of user interaction data generated by image recognition from image data of a user interacting with a product from a device on a network and a first set of user sentiment data related to the product from a communication channel, wherein the user interaction data and user sentiment data are specific to the user;
    generating a user profile for the user, wherein the user profile includes a satisfaction threshold for using the product based in part on the first set of user interaction data and the first set of user sentiment data, wherein the first set of user interaction data indicates a high usage pattern with the product and the first set of user sentiment data indicates positive sentiment about the product;
    monitoring a second set of user interaction data generated by image recognition from image data of the user interacting with the product from the device on the network and a second set of user sentiment data from the communication channel;
    comparing the second set of user interaction data and the second set of user sentiment data to the satisfaction threshold, wherein at least the second set of user interaction data indicates a low usage pattern with the product or the second set of user sentiment data indicates negative sentiment about the product;
    determining that the user is experiencing dissatisfaction with the product when the satisfaction threshold has been exceeded;
    in response to the satisfaction threshold being exceeded, transmitting a software update to fix a problem related to the product in order to mitigate the dissatisfaction of the user;
    monitoring, in response to the software update being implemented, a third set of user interaction data generated by image recognition from image data of the user interacting with the product;
    comparing the third set of user interaction data to the satisfaction threshold;
    determining that the user is satisfied with the product in response to the satisfaction threshold not being exceeded;
    categorizing, using machine learning, a behavioral type of the user based on data associated with the user profile;
    correlating, using machine learning, the behavioral type of the user with similar behavioral types of a plurality of other users based on past incident history and similar satisfaction thresholds; and
    updating, using machine learning and based on analyzing the third set of interaction data in response to the software update, one or more actions for mitigating user dissatisfaction for the plurality of other users when interacting with a similar product.

2. The computer-implemented method of claim 1, wherein the satisfaction threshold is generated by:
    analyzing, using machine learning, the first set of user interaction data to determine an initial usage pattern of the user related to the product;
    analyzing, using natural language understanding, the first set of user sentiment data to determine an initial feeling the user has related to the product; and
    generating, using machine learning, the satisfaction threshold by utilizing a scoring model for the analyzed first set of user interaction data and the analyzed first set of user sentiment data.

3. The computer-implemented method of claim 1, wherein the communication channel is selected from the group of:
    a social media website;
    a service provider website;
    a product manufacturer web site; and
    a customer service telecommunications line.

4. The computer-implemented method of claim 1, wherein the device is an Internet of Things (IoT) device, and wherein the network is an IoT network.

5. The computer-implemented method of claim 1, wherein the product is an IoT device.

6. The computer-implemented method of claim 1, wherein the product is an application accessible by one or more IoT devices.

7. A system comprising:
    a network;
    a communication channel;
    a processor; and
    a computer-readable storage medium communicatively coupled to the processor and storing program instructions which, when executed by the processor, cause the processor to perform a method comprising:
        collecting a first set of user interaction data generated by image recognition from image data of a user interacting with a product from a device on the network and a first set of user sentiment data related to the product from the communication channel, wherein the user interaction data and user sentiment data are specific to the user;
        generating a user profile for the user, wherein the user profile includes a satisfaction threshold for using the product based in part on the first set of user interaction data and the first set of user sentiment data, wherein the first set of user interaction data indicates a high usage pattern with the product and the first set of user sentiment data indicates positive sentiment about the product;
        monitoring a second set of user interaction data generated by image recognition from image data of the user interacting with the product from the device on the network and a second set of user sentiment data from the communication channel;
        comparing the second set of user interaction data and the second set of user sentiment data to the satisfaction threshold, wherein at least the second set of user interaction data indicates a low usage pattern with the product or the second set of user sentiment data indicates negative sentiment about the product;
        determining that the user is experiencing dissatisfaction with the product when the satisfaction threshold has been exceeded;
        in response to the satisfaction threshold being exceeded, transmitting a software update to fix a problem related to the product in order to mitigate the dissatisfaction of the user;

monitoring, in response to the software update being implemented, a third set of user interaction data generated by image recognition from image data of the user interacting with the product;

comparing the third set of user interaction data to the satisfaction threshold;

determining that the user is satisfied with the product in response to the satisfaction threshold not being exceeded;

categorizing, using machine learning, a behavioral type of the user based on data associated with the user profile;

correlating, using machine learning, the behavioral type of the user with similar behavioral types of a plurality of other users based on past incident history and similar satisfaction thresholds; and updating, using machine learning and based on analyzing the third set of interaction data in response to the software update, one or more actions for mitigating user dissatisfaction for the plurality of other users when interacting with a similar product.

8. The system of claim 7, wherein the software update is transmitted to the user via contact information associated with the user profile.

9. The system of claim 7, wherein the satisfaction threshold is generated by:

analyzing, using machine learning, the first set of user interaction data to determine an initial usage pattern of the user related to the product;

analyzing, using natural language understanding, the first set of user sentiment data to determine an initial feeling the user has related to the product; and generating, using machine learning, the satisfaction threshold by utilizing a scoring model for the analyzed first set of user interaction data and the analyzed first set of user sentiment data.

10. The system of claim 7, wherein the communication channel is selected from the group of:

a social media website;
a service provider website;
a product manufacturer web site; and
a customer service telecommunications line.

11. A computer program product comprising a computer-readable storage medium having program instructions embodied therewith, the program instructions executable by a processor to cause the processor to perform a method comprising:

collecting a first set of user interaction data generated by image recognition from image data of a user interacting with a product from a device on a network and a first set of user sentiment data related to the product from a communication channel, wherein the user interaction data and user sentiment data are specific to the user;

generating a user profile for the user, wherein the user profile includes a satisfaction threshold for using the product based in part on the first set of user interaction data and the first set of user sentiment data, wherein the first set of user interaction data indicates a high usage pattern with the product and the first set of user sentiment data indicates positive sentiment about the product;

monitoring a second set of user interaction data generated by image recognition from image data of a user interacting with the product from the device on the network and a second set of user sentiment data from the communication channel;

comparing the second set of user interaction data and the second set of user sentiment data to the satisfaction threshold, wherein at least the second set of user interaction data indicates a low usage pattern with the product or the second set of user sentiment data indicates negative sentiment about the product;

determining that the user is experiencing dissatisfaction with the product when the satisfaction threshold has been exceeded;

in response to the satisfaction threshold being exceeded, arranging, automatically, a customer service appointment to address a problem related to the product that is causing the dissatisfaction of the user;

monitoring, in response to the service appointment being completed, a third set of user interaction data generated by image recognition from image data of the user interacting with the product;

comparing the third set of user interaction data to the satisfaction threshold;

determining that the user is satisfied with the product in response to the satisfaction threshold not being exceeded;

categorizing, using machine learning, a behavioral type of the user based on data associated with the user profile;

correlating, using machine learning, the behavioral type of the user with similar behavioral types of a plurality of other users based on past incident history and similar satisfaction thresholds; and updating, using machine learning and based on analyzing the third set of interaction data in response to the completion of the service appointment, one or more actions for mitigating user dissatisfaction for the plurality of other users when interacting with a similar product.

12. The computer program product of claim 11, wherein the satisfaction threshold is generated by:

analyzing, using machine learning, the first set of user interaction data to determine an initial usage pattern of the user related to the product;

analyzing, using natural language understanding, the first set of user sentiment data to determine an initial feeling the user has related to the product; and generating, using machine learning, the satisfaction threshold by utilizing a scoring model for the analyzed first set of user interaction data and the analyzed first set of user sentiment data.

13. The computer program product of claim 11, wherein the communication channel is selected from the group of:

a social media website;
a service provider website;
a product manufacturer web site; and
a customer service telecommunications line.

14. The computer-implemented method of claim 1, wherein the product is an Internet of Things (IoT) device, and the user interaction data includes metadata indicating how the user interacts with software features of the IoT device.

15. The computer-implemented method of claim 14, wherein the IoT device is a smart phone.

16. The computer-implemented method of claim 1, wherein the product is a software application and the device is a smart phone, and wherein the user interaction data includes metadata indicating how the user interacts with the software application on the smart phone.

17. The computer-implemented method of claim 16, wherein the software application is a streaming service and the user interaction data includes a frequency related to use of the streaming service.

18. The computer-implemented method of claim 1, further comprising:
- monitoring, in response to the software update being implemented, a third set of user sentiment data from the communication channel;
- comparing the third set of user sentiment data to the satisfaction threshold;
- determining that the user is satisfied with the product in response to the satisfaction threshold not being exceeded; and
- updating, using machine learning and based in part on analyzing the third set of sentiment data, the one or more actions for mitigating user dissatisfaction for other users when interacting with the similar product.

* * * * *